United States Patent
Vonach et al.

(10) Patent No.: US 9,681,503 B2
(45) Date of Patent: Jun. 13, 2017

(54) TRANSFORMER FOR A LAMP, LED CONVERTER, AND TRANSFORMER OPERATION METHOD

(71) Applicant: TRIDONIC GMBH & CO KG, Dornbirn (AT)

(72) Inventors: Christoph Vonach, Dornbirn (AT); Eduardo Pereira, Siebnen (CH)

(73) Assignee: TRIDONIC GMBH & CO KG, Dornbirn (AT)

( * ) Notice: Subject to any disclaimer, the term of this patent is extended or adjusted under 35 U.S.C. 154(b) by 37 days.

(21) Appl. No.: 14/390,856

(22) PCT Filed: Apr. 15, 2013

(86) PCT No.: PCT/AT2013/000064
§ 371 (c)(1),
(2) Date: Oct. 6, 2014

(87) PCT Pub. No.: WO2013/152367
PCT Pub. Date: Oct. 17, 2013

(65) Prior Publication Data
US 2015/0028761 A1    Jan. 29, 2015

(30) Foreign Application Priority Data
Apr. 13, 2012   (DE) .................. 10 2012 007 478

(51) Int. Cl.
*H05B 33/08* (2006.01)
*H02M 3/335* (2006.01)
(Continued)

(52) U.S. Cl.
CPC ........ *H05B 33/08* (2013.01); *H02M 3/33569* (2013.01); *H05B 33/0815* (2013.01);
(Continued)

(58) Field of Classification Search
CPC  H05B 33/0815; H05B 41/24; H05B 33/0818; H05B 41/28; H05B 41/36;
(Continued)

(56) References Cited

U.S. PATENT DOCUMENTS

2009/0273301 A1* 11/2009 De Anna ............ H05B 33/0815
                                                                            315/294
2010/0141177 A1    6/2010 Negrete et al.
(Continued)

FOREIGN PATENT DOCUMENTS

DE      102010031233 A1    9/2011
EP        2302984 A1    3/2011
(Continued)

*Primary Examiner* — Alexander H Taningco
*Assistant Examiner* — Renan Luque
(74) *Attorney, Agent, or Firm* — Volpe and Koenig, P.C.

(57) ABSTRACT

A galvanically isolated transformer (59) for energizing a lamp (5) comprises a primary circuit (60) including a half-bridge circuit that has two reciprocally clocked switches (21, 22), and including an LLC resonant circuit (25-27). The transformer (59) further comprises a secondary circuit (30) including an output (35) for supplying energy to the lamp (5). A control device (14) is designed to control the half-bridge circuit in accordance with a control variable (ipeak) detected in the primary circuit (60) in order to adjust a current intensity supplied to the lamp (5) by the secondary circuit (30) to a desired value.

14 Claims, 6 Drawing Sheets

(51) Int. Cl.
*H05B 37/02* (2006.01)
*H02M 1/00* (2006.01)
*H02M 7/04* (2006.01)

(52) U.S. Cl.
CPC ............... *H05B 37/02* (2013.01); *H02M 7/04* (2013.01); *H02M 2001/0025* (2013.01); *Y02B 20/348* (2013.01)

(58) Field of Classification Search
CPC .... H05B 37/00; H05B 37/03; H05B 41/2853; H05B 41/3927; H05B 33/0824; H05B 33/0851; H05B 41/2828; H05B 33/0845; H05B 33/0839; H05B 33/089; H05B 33/08; H05B 33/0812; Y02B 20/346; Y02B 70/1433; Y02B 20/348; Y02B 70/1491; Y02B 70/16; H02M 2001/0058; H02M 1/4241; H02M 2007/4811; H02M 2007/4815; H02M 2007/4818; H02M 7/4826; H02M 1/08; H02M 3/33569; H02M 3/33507; H02M 2001/0009; H02M 2001/0035

USPC ... 315/224, 291, 307, 294, 247, 209 R, 312; 363/21.02, 21.03, 21.08
See application file for complete search history.

(56) References Cited

U.S. PATENT DOCUMENTS

| | | | |
|---|---|---|---|
| 2010/0244726 A1* | 9/2010 | Melanson | H02M 3/33523 315/291 |
| 2011/0260631 A1* | 10/2011 | Park | H05B 33/0815 315/165 |
| 2012/0033453 A1* | 2/2012 | Gong | H02M 3/33592 363/21.02 |
| 2012/0106206 A1* | 5/2012 | Tang | H02M 1/4258 363/21.02 |
| 2012/0134705 A1* | 5/2012 | Fukutani | H02M 3/33569 399/88 |
| 2012/0194078 A1* | 8/2012 | Ren | H05B 33/0887 315/122 |
| 2012/0250360 A1* | 10/2012 | Orr | H02M 3/3376 363/21.02 |
| 2012/0262086 A1* | 10/2012 | Feldtkeller | H05B 41/2828 315/291 |
| 2013/0320871 A1* | 12/2013 | Ge | H05B 33/0815 315/200 R |

FOREIGN PATENT DOCUMENTS

| | | |
|---|---|---|
| JP | 2011060615 A | 3/2011 |
| WO | 2009156891 A1 | 12/2009 |
| WO | 2010008709 A1 | 1/2010 |
| WO | 2010065598 A2 | 6/2010 |
| WO | 2011113960 A2 | 9/2011 |

* cited by examiner

TRANSFORMER FOR A LAMP, LED CONVERTER, AND TRANSFORMER OPERATION METHOD

FIELD OF THE INVENTION

The invention relates to a converter for supplying power to a light-emitting means, to an LED converter device, and to a method for operating a converter. The invention relates in particular to those apparatuses and methods in which energy is supplied to a light-emitting means, in particular a light-emitting means which comprises one or more light-emitting diodes, using a so-called SELV ("separated extra-low voltage" or "safety extra-low voltage") device. The invention furthermore relates to those apparatuses and methods which enable dimming of the light-emitting means.

BACKGROUND

Converters with electrical isolation are used for the galvanically decoupled transfer of electrical energy from an input side to an output side. Such converters are used in various applications for supplying current or voltage, such as, for example, in clocked switched mode power supplies. In the case of clocked converters, controllable switches, which can be configured in the form of power switches, are used and are operated in clocked fashion in order to transfer electrical energy to the output side. A galvanically decoupled energy transfer can be achieved by the use of a transformer or another transfer device. Such a galvanic isolation or electrical isolation is required for safety reasons in order to isolate an ELV ("extra-low voltage") region from regions with a relatively high supply voltage, in particular mains voltage, by means of a so-called potential barrier or SELV barrier.

Converters which are configured as so-called resonant converters which have a resonant circuit can be used for operating light-emitting means. The resonant circuit can be a series or parallel resonant circuit. When configuring converters, the aim is to keep losses low. In the case of converters which are intended to be suitable for operation of dimmable light-emitting means, in particular of light-emitting diodes (LEDs) such as inorganic LEDs or organic LEDs (OLEDs), there is increasingly the demand for enabling dimmability over a wide range.

One possibility of regulating an output current or an output voltage on the ELV side of an operating device consists in detecting and processing a controlled variable on the ELV side. The regulation step can take place completely on the ELV side, wherein, for example, a switch on the ELV side is actuated depending on the controlled variable. Alternatively, the regulation step can also be implemented on the input side of the converter, which is operated at a higher supply voltage. However, until now this has required that the controlled variable detected on the secondary side is fed back to the input side via an insulator. The bypassing of the SELV barrier requires corresponding components which increase the installation space required and/or the costs of the operating device. US 2012/0033453 A1 describes an example of a resonant converter which comprises a half-bridge and an LLC circuit and in which an insulator is provided in order to feed back a variable measured on the output side to the input side. US 2012/0033453 A1 describes an example of a resonant converter in which switches in a low-voltage region of the converter are actuated depending on a controlled variable detected on the secondary side.

There is a need for apparatuses and methods which provide improvements in respect of the mentioned objects. In particular, there is a need for apparatuses and methods in which the complexity in terms of circuitry and/or the costs which are associated with the bypassing of the SELV barrier can be reduced or avoided. There is also a need for those apparatuses and methods which enable efficient energy transfer and dimmability over a wide range.

SUMMARY

In accordance with the invention, a converter, an LED converter device and a method having the features specified in the independent claims are set forth. The dependent claims define embodiments.

In accordance with exemplary embodiments of the invention, a converter, which comprises a primary-side half-bridge circuit with clocked operation and an LLC resonant circuit, is operated in such a way that an output current intensity of a secondary-side circuit which is galvanically isolated from the primary-side circuit is regulated depending on a controlled variable detected in the primary-side circuit. The converters and methods in accordance with exemplary embodiments in this case make use of the fact that a current in the primary-side circuit, for example a peak current through a shunt resistor connected in series with the switches in the half-bridge circuit, has a known relationship with a current intensity provided on the output side. The output current intensity can be regulated on the basis of a controlled variable detected on the primary side without the output current intensity needing to be detected on the secondary side and/or fed back via a separate insulator via the SELV barrier for this purpose. The controlled variable can be compared on the primary side with a reference. For example, a corresponding comparator can be used for this purpose. Owing to the use of a resonant converter, which is configured with an LLC resonant circuit, and half-bridge driving, efficient energy transfer and dimmability can be achieved. The reference with which the controlled variable is compared can be adapted for dimming or for implementing commands in respect of luminosity. The regulation of the output current intensity can take place without corresponding logic and/or switches needing to be provided on the secondary side for this purpose.

In accordance with one exemplary embodiment, a converter with electrical isolation which is configured to supply power to a light-emitting means is specified. The converter comprises a primary-side circuit with a half-bridge circuit, which has two alternately clocked switches, and with a resonant circuit, which is coupled to a node between the two switches. The resonant circuit comprises an LLC resonant circuit and can in particular be a series LLC resonant circuit. The converter comprises a secondary-side circuit with an output for supplying energy to the light-emitting means. A control device is configured to control the half-bridge circuit depending on a controlled variable detected in the primary-side circuit in order to regulate a current intensity provided to the light-emitting means by the secondary-side circuit to a setpoint value.

Such a converter enables the regulation of the output current intensity without this needing to be detected on the secondary side and/or fed back via the SELV barrier.

The converter can be in the form of a constant current source or FCC ("fixed constant current") device. The converter can be configured as a device with galvanic isolation between the SELV region and the non-SELV region.

The control device can be configured to set a frequency at which the two switches in the half-bridge circuit are switched depending on the detected controlled variable in order to regulate the current intensity provided to the light-emitting means by the secondary-side circuit to the setpoint value. The control device can adapt the frequency at which each of the two switches is switched.

The control device can be configured to control the half-bridge circuit depending on a comparison between the controlled variable and a reference. This enables a simple and inexpensive implementation of the regulation of the output current intensity.

The converter can comprise a comparator, which is coupled to the control device, for comparing the controlled variable with the reference. The reference can be an analog reference signal, which can be provided to the comparator by the control device.

The primary-side circuit can be configured to provide information on a supply voltage of the primary-side circuit to the control device. The control device can be configured to change the reference depending on the information on the supply voltage. The supply voltage can be a bus voltage, which is provided by a smoothing circuit or circuit for power factor correction (PFC).

The control device can be configured to change the reference depending on a ripple of the supply voltage. The control device can be configured to change the reference depending on the ripple of the supply voltage with a time period which corresponds to the period of the ripple of the supply voltage.

The control device can be configured to change the reference depending on a dimming command. The configuration of the converter as a resonant converter with clocked operation enables dimmability over a wide range.

The control device can be configured to determine information on a load which is connected to the output of the secondary-side circuit depending on a measured variable detected in the primary-side circuit. Therefore, it is also possible for the load to be identified without the SELV barrier needing to be bypassed for this purpose. The measured variable can be different than the controlled variable.

The control device can be configured to detect changes in a number of LEDs which are connected to the output of the secondary-side circuit, depending on the measured variable. The control device can be configured to change the reference depending on the load which is connected to the output of the secondary-side circuit without a signal fed back from the secondary-side circuit via an insulator being required for this purpose. The control device can be configured to change the reference in such a way that changes in the output current induced by changes in the load are reduced by adaptation of the reference. The control device can be configured to change the reference in such a way that a consistent current intensity is provided by the converter for different numbers of LEDs to which power is supplied by the converter. Fluctuations caused by changes in the load can be kept lower than a threshold value. The load-dependent compensation can take place by means of the control device computationally and/or using stored data for compensation, for example on the basis of a family of characteristics.

As an alternative or in addition, the control device can be configured to initiate a procedure for limiting the output power depending on the measured variable.

Alternatively or additionally, the control device can be configured to implement fault detection depending on the measured variable and to initiate a fault operating state in the event that a fault state is detected. Examples of faults detected by the control device include a short circuit and/or an open circuit at the output of the converter. The fault operating state can be realized in such a way that the control device outputs a signal which indicates the fault, initiates a safety shutdown and/or initiates other measures which prevent impermissible operating states of the converter.

Alternatively or additionally, the control device can be configured to output a signal which contains information on the load identified, depending on the measured variable. Such a signal can be, for example, a signal generated in accordance with the DALI ("digital addressable lighting interface") standard, for example a data telegram. The signal can be generated in response to a corresponding DALI query.

The controlled variable can be proportional to a peak value of a current in the primary-side circuit, and the measured variable can be proportional to an average value of the same current in the primary-side circuit. The primary-side circuit can comprise a shunt resistor, which is connected in series with the switches in the half-bridge circuit. The controlled variable can be proportional to a peak current through the shunt resistor, and the measured variable can be proportional to an average value of the current through the shunt resistor.

The resonant circuit can comprise an inductive element and a capacitive element, which are connected in series with a primary coil of a transformer. The resonant circuit can comprise two inductances and a capacitance in a series circuit.

The secondary-side circuit can comprise a further inductive element, which is connected to the output. The secondary-side circuit can comprise a rectifier and an inductance connected downstream of the output of the rectifier.

In accordance with a further exemplary embodiment, an LED converter device which comprises the converter in accordance with one exemplary embodiment is provided.

In accordance with a further exemplary embodiment, a lighting system which comprises the LED converter device and a light-emitting means coupled thereto is specified. The light-emitting means can comprise one or more light-emitting diodes (LEDs). The LEDs can comprise inorganic and/or organic LEDs. The LEDs can be integrated in an LED module, which is formed separately from the LED converter device. The lighting system can further comprise a central control system, which is configured to communicate dimming commands to the LED converter device.

In accordance with a further exemplary embodiment, a method for operating a converter for a light-emitting means is specified. The converter comprises a primary-side circuit and a secondary-side circuit galvanically isolated therefrom. The primary-side circuit comprises a half-bridge circuit, which has two alternately clocked switches, and a resonant circuit, which is coupled to a node between the two switches, wherein the resonant circuit comprises an LLC resonant circuit. In the method, the half-bridge circuit is controlled depending on a controlled variable detected in the primary-side circuit in such a way that a current intensity output to the light-emitting means by the secondary-side circuit is regulated to a setpoint value.

Configurations of the method in accordance with advantageous or preferred exemplary embodiments and the effects achieved thereby in each case correspond to the configurations described with reference to the converter and the LED converter device.

BRIEF DESCRIPTION OF THE DRAWINGS

The invention will be explained in more detail below with reference to the attached drawing using preferred exemplary embodiments.

DETAILED DESCRIPTION OF THE PREFERRED EMBODIMENTS

The features of the various exemplary embodiments described below can be combined with one another insofar as this is not expressly ruled out in the description below.

Figure 1:
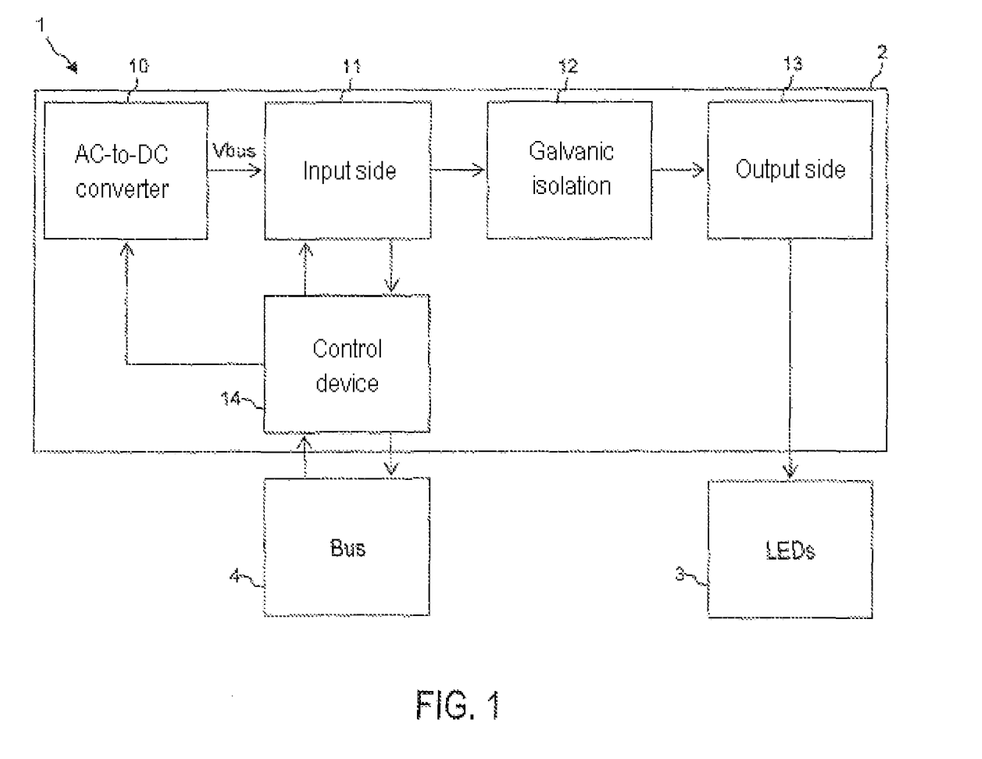
FIG. 1 shows a schematic illustration of a lighting system having an LED converter device in accordance with an exemplary embodiment.

FIG. 1 shows a lighting system 1 in which an operating device 2 in accordance with an exemplary embodiment supplies energy to LEDs 3. The operating device 2 can be configured as an LED converter device. The LED converter device 2 can be in the form of a constant current source. The LED converter device 2 can be configured in such a way that the luminosity of the LEDs 3 can be settable via commands, which are transmitted via a bus 4 or wirelessly, for example. The LED converter device 2 can comprise a corresponding interface for communication with a central control device and can be configured to receive dimming commands via the interface and to output information on the operating state of the LED converter device 2 and/or the LEDs 3 via the interface.

The LED converter device 2 can be configured as an SELV device, in which a primary-side circuit (for example a non-SELV side) and a secondary-side circuit (for example an SELV side) are galvanically isolated. The LED converter device 2 can comprise an AC-to-DC converter 10. The AC-to-DC converter 10 can be configured to be coupled on the input side to a mains voltage. The AC-to-DC converter 10 can be configured as a so-called smoothing circuit or circuit for power factor correction (PFC). The AC-to-DC converter 10 provides a bus voltage Vbus to a converter, which has an input-side or primary-side circuit 11 and an output-side or secondary-side circuit 13 galvanically isolated therefrom. Galvanic isolation is achieved by a transformer 12 or another converter unit.

The LED converter device 2 is configured in such a way that a current intensity provided by the LED converter device 2 to the LEDs is regulated to a setpoint value. The regulation takes place in this case on the basis of a controlled variable, which is detected in the primary-side circuit 11 and which in particular can be a peak current through a resistance or a variable proportional to this peak current. In addition to the output current, an output power can also be set. In order to regulate the output current depending on the controlled variable detected in the primary-side circuit, the control device 14 is correspondingly coupled to the primary-side circuit 11 in order to receive the controlled variable or information on a comparison between the controlled variable and a reference. The control device 14 controls a half-bridge circuit of the primary-side circuit 11 depending on the comparison between the controlled variable and the reference. The control device 14 can in particular change a frequency at which two switches of the half-bridge circuit are switched, depending on the comparison between the controlled variable and the reference. The control device 14 can additionally perform further functions, such as the adaptation of the reference depending on a dimming command, the identification of the load connected to the LED converter device 2, in particular in order to identify a number of LEDs or the output power, and/or the identification of fault states. Such functions and configurations will be described in more detail with reference to FIGS. 2 10. The control device 14 can also be coupled to the AC-to-DC converter in order to adapt the bus voltage, for example.

As illustrated schematically in FIG. 1, in the case of the LED converter device 2, the output current which is provided to the LEDs 3 can be regulated without a measurement needing to be performed on the SELV side for this purpose and/or without a corresponding measurement result needing to be fed back via the SELV barrier. The control device 14 is configured in such a way that it controls at least one component of the primary-side circuit 11 depending on a peak current measured on the primary side in order to regulate the output current, which is provided by the operating device 2 to the LEDs 3, to a desired value.

Figure 2:
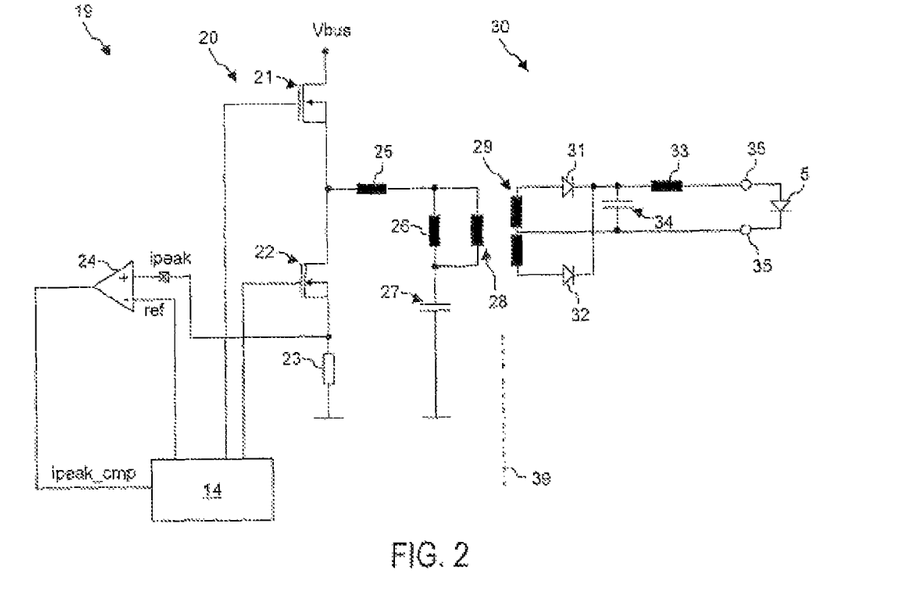
FIG. 2 shows a circuit diagram of a converter in accordance with an exemplary embodiment.

FIG. 2 shows a circuit diagram of a converter 19 in accordance with an exemplary embodiment. The converter 19 comprises a primary-side circuit 20 and a secondary-side circuit 30. There is electrical isolation between the primary-side circuit 20 and the secondary-side circuit 30. A transformer having a primary coil 28 and a secondary coil 29 can be provided for the isolation. The transformer has a magnetizing inductance, which can also act as one of the inductances of an LLC resonant circuit. This is illustrated symbolically in FIG. 2 as the second inductance 26. In the case of the LED converter device 2 or in the case of another operating device, the converter 19 can be used to operate LEDs in order to perform the functions of the primary-side circuit 11 illustrated in FIG. 1, the galvanic isolation 12 and the secondary-side circuit 13. The converter 19 acts as DC-to-DC converter. The primary-side circuit 20 can be a non-SELV region and the secondary-side circuit 30 can be an SELV region, which are separated by an SELV barrier 39.

The primary-side circuit 20 comprises an LLC resonant circuit, which is configured as a series resonant circuit. The LLC resonant circuit has a first inductance 25, a second inductance 26 and a capacitance 27 in a series circuit. The second inductance 26, as mentioned, is the leakage inductance of the primary coil 28. The second inductive element 26 represents, as mentioned, the magnetizing inductance of the primary coil 28 of the transformer. The second inductive element 26 can be the magnetizing inductance of the resonant circuit, whose inductance is greater than the first inductance 25. The first inductance 25 can also be integrated in the transformer and can be, for example, a leakage inductance. Alternatively, an additional inductance in addition to the primary coil 28 of the transformer can also be used and can also act as one of the two inductances in the LLC resonant circuit. Other configurations of the LLC resonant circuit are likewise possible. For example, the capacitance 27 can be connected between the first inductance 25 and the second inductance 26.

The primary-side circuit 20 comprises a half-bridge circuit having a first switch 21, which can be a power switch, and a second switch 22, which can be a power switch. The first switch 21 and the second switch 22 can be identical, and the half-bridge circuit can be in the form of a symmetrical half-bridge circuit. A shunt resistor 23 is connected in series with the first switch 21 and the second switch 22. The resonant circuit is connected to a node between the first switch 21 and the second switch 22. The resonant circuit is connected to the center of the half-bridge circuit between the two switches 21 and 22. A first connection of the first inductance 25 of the resonant circuit can be connected to the node between the first switch 21 and the second switch 22 of the half-bridge circuit. A second connection of the first inductance 25 can be connected to a first connection of the second inductance 26 of the resonant circuit. A second connection of the second inductance 26 of the resonant circuit can be connected to a first connection of the capacitance 27.

During operation of the converter 19, the control device 14 controls the first switch 21 and the second switch 22. In this case, each of the switches can be switched on and off in each case at the same preset frequency. The control device 14 controls the first switch 21 and the second switch 22 in such a way that only ever one of the two switches is switched on. The first switch 21 and the second switch 22 are operated alternately in clocked fashion by the control device 14. The dead time between one switch being switched off and the respective other switch being switched on can be small, in particular much smaller than the inverse of the switching frequency.

Figure 3:
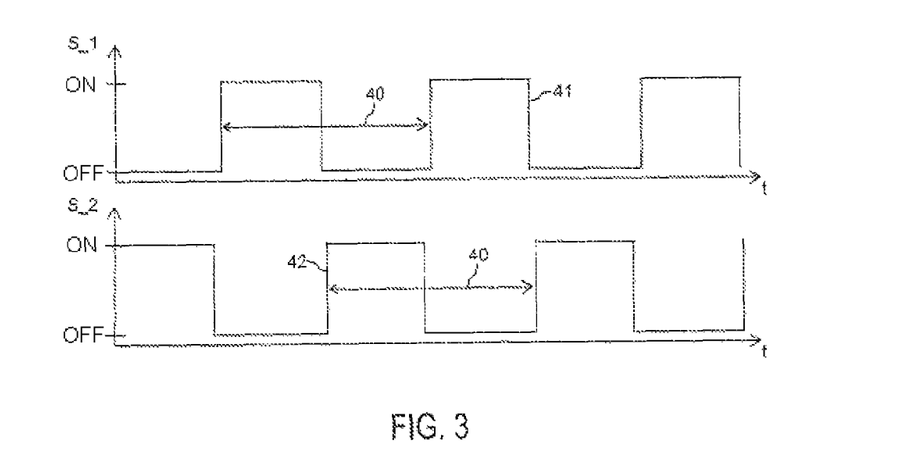
FIG. 3 shows control commands generated by the control device of the converter for half-bridge control.

FIG. 3 shows, schematically, the state of the first switch 21 in curve 41 and the state of the second switch 22 in curve 42, as is set by the control device 14. A time interval 40 between two rising edges of the gate voltage applied to the switches by the control device 14 is dependent on the switching frequency, which can generally be matched to the resonant frequency of the LLC resonant circuit. The frequency at which the first switch 21 and the second switch 22 are switched can be varied by the control device 14 in order to regulate a current provided at an output 35 of the converter for a load 5 to a specific setpoint value. The control device 14 can be configured in such a way that the frequency at which the first switch 21 and the second switch 22 are switched is set depending on a peak current through the shunt resistor 23, as will be described further below.

As illustrated in FIG. 2, the secondary-side circuit 30 has a rectifier which is connected downstream of the secondary coil 29 and which can be formed, for example, by a first diode 31 and a second diode 32. A center of the secondary coil 29 can be coupled to an output of the secondary-side circuit. Ends of the secondary coil 29 can be coupled to the output 35 via the diodes 31 and 32. In order to smooth the output current, an inductive element 33, for example a coil, can be provided, by means of which current is supplied to the output 35. A capacitor 34 can be connected between the outputs of the rectifier. The capacitor 34 can have a comparatively low capacitance. By virtue of the configuration of the secondary-side circuit 30 with the inductive element 33, the converter 19 can be operated as a constant current source or FCC device.

A load 5 connected to the output 35 can comprise an LED, an LED string of a plurality of LEDs or a plurality of LED strings. The LEDs can be integrated in an LED module.

Regulation of the output current at the output 35 of the converter 19 takes place depending on a peak current measured on a primary side and by virtue of control of the primary-side switches in the half-bridge circuit. In order to regulate the output current to the setpoint value, it is not necessary to provide switches and/or evaluation logic for a regulation step in the secondary-side circuit 30. As illustrated in FIG. 2, the secondary-side circuit 30 can be configured in such a way that it does not comprise evaluation logic for a regulation step. Furthermore, no insulator is necessary for transmitting a controlled variable via the SELV barrier.

The peak current through the shunt resistor 23 can be used as controlled variable. The peak current through the shunt resistor 23 in the case of the converter 19 has a known relationship with respect to the output current at the output 35 of the converter. Correspondingly, the peak current through the shunt resistor 23, which can be detected on the primary side, can be used to regulate the output current of the converter 19 and to operate the converter 19 as FCC device. Depending on the controlled variable detected on the primary side, the half-bridge can be driven correspondingly in order to regulate the output current. It is not necessary to provide switches on the secondary side for the regulation of the output current.

The converter 19 can be configured in such a way that the peak current ipeak through the shunt resistor 23 is compared with a reference ref. For this purpose, a comparator 24 can be provided. A signal which is proportional to a current through the shunt resistor is supplied to a first input of the comparator 24. The reference ref is supplied to a second input of the comparator. The reference ref can be generated by the control device 14, for example. An output signal ipeak_cmp of the comparator 24 can indicate whether the peak current through the shunt resistor 23 exceeds the reference ref. Depending on whether the peak current through the shunt resistor 23 exceeds the reference ref, the control device 14 can adapt the frequency at which the first switch 21 and the second switch 22 are switched. The regulation of the output current of the converter 19 takes place depending on the peak current ipeak detected on the primary side and as a result of driving of the half-bridge circuit in the primary-side circuit. A comparison between the peak current ipeak detected on the primary side and the reference ref can be performed with a small amount of complexity in terms of circuitry using the comparator 24.

The adaptation of the frequency at which the first switch 21 and the second switch 22 are switched can be performed by the control device 14 using predetermined frequency or time increments and/or on the basis of a family of characteristics. The control device 14 can be configured as an integrated semiconductor circuit, which can be a special application-specific circuit. The control device 14 can in particular be configured as an ASIC ("application-specific integrated circuit"). The control device 14 can also be configured as a programmable circuit, which is programmed by firmware or software in such a way that it adapts the control of the half-bridge circuit depending on the peak current through the shunt resistor 23.

In one configuration of the converter 19, the control device 14 can control the half-bridge circuit depending on a comparison between the peak current detected on the primary side and a preset, fixed reference. In further exemplary embodiments, the control device 14 can vary the reference in order to perform additional functions, for example in order to reduce ripple of the output current, to implement a dimming command and/or to compensate for load-dependent changes in the output current.

Figure 4:
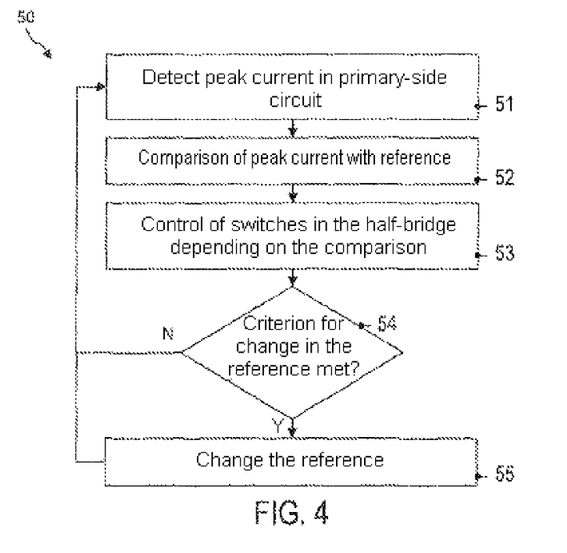
FIG. 4 shows a flowchart of a method in accordance with an exemplary embodiment.

FIG. 4 shows a flow chart of a method 50, which can be implemented by the control device 14 for controlling a converter. The converter can be configured as a converter in accordance with an exemplary embodiment. The converter has a primary-side circuit and a secondary-side circuit galvanically isolated therefrom. The primary-side circuit can be, for example, a non-SELV region of the converter, and the secondary-side circuit can be the SELV region of the converter.

At 51, a peak current is detected in the primary-side circuit. The peak current can be the peak current through a shunt resistor, which is connected in series with switches in a half-bridge circuit. At 52, the peak current is compared with a reference. In this case, it is possible to determine whether the peak current exceeds the reference. At 53, the half-bridge circuit is controlled on the basis of a result of the comparison. In this case, a frequency at which of the half-bridge circuit is switched in clocked fashion can be adapted selectively depending on whether the peak current exceeds the reference. Steps 51-53 can be repeated.

When one or more regulation cycles have been run through with steps 51-53, a check can be performed at 54 to ascertain whether a criterion for the change in the reference has been met. A plurality of criteria can be used in which in each case the reference is changed. For example, the reference can be changed depending on the bus voltage which supplies the primary-side circuit. The reference can in particular be changed in accordance with a ripple of the bus voltage in order to reduce ripple of the output current. As an alternative or in addition, the reference can be changed depending on a dimming command received by the control device 14 in order to set the output current to a new fixed value and thus to change the luminosity of the supplied LEDs. As an alternative or in addition, the load which is connected to the output of the converter can be determined at least in certain operating states, for example during starting of the converter, depending on a measured variable detected on the primary side. The reference can be changed depending on the load in order to reduce load-dependent changes in the output current.

If it is determined at step 54 that the reference is not intended to be changed, the method returns to step 51. A regulation cycle or a plurality of regulation cycles can be run through again. If it is determined at step 54 that the reference is intended to be changed, the reference is changed correspondingly at step 55. The reference can be changed, for example, depending on a received dimming command. For this purpose, the control device 14 can convert a received luminosity value into a new value for the reference using a family of characteristics, for example a lookup table, and/or in another way computationally. The method returns to step 51, wherein, in the next regulation cycle, the new value of the reference is compared.

In order to perform adaptation of the reference depending on the bus voltage and/or depending on a load which is coupled to the output of the converter, the primary-side circuit of the converter can detect corresponding variables and provide them to the control device 14.

Figure 5:
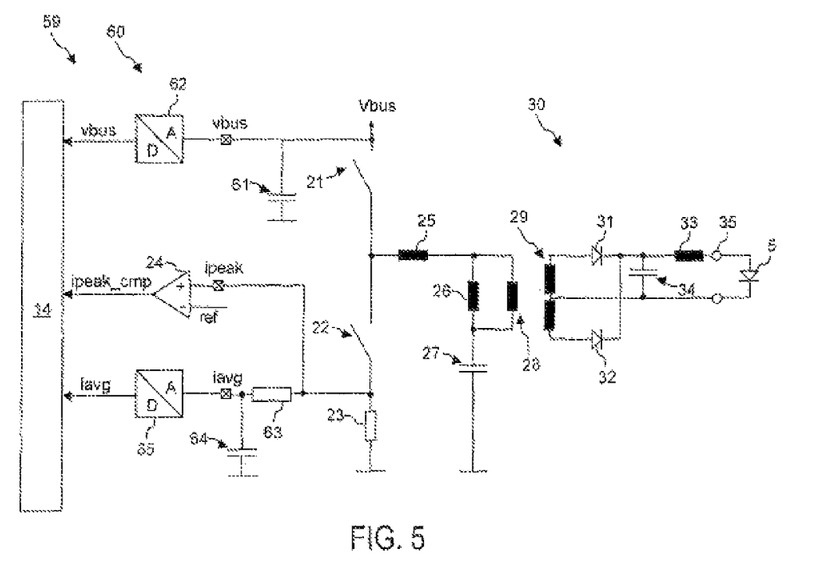
FIG. 5 shows a circuit diagram of a converter in accordance with a further exemplary embodiment.

FIG. 5 shows a circuit diagram of a converter 59 in accordance with a further exemplary embodiment. Elements or devices which correspond in terms of configuration and function to elements or devices which have already been described with reference to FIGS. 1 4 are denoted by the same reference symbols.

The converter 59 has a primary-side circuit 60 with a half-bridge circuit with clocked operation and an LLC resonant circuit. The control device 14 is configured in such a way that it performs the control of the half-bridge circuit depending on a peak current detected on the primary side in order to regulate the output current of the converter 59. In this case, the reference can be set depending on the bus voltage Vbus and/or depending on a load which is connected to the output of the converter.

A value vbus of the bus voltage Vbus is supplied to the control device 14 via a digital-to-analog converter 62. Radiofrequency noise of the bus voltage can be smoothed by a capacitor 61 or also by, for example, an RC element (resistance and capacitor) as low-pass filter. The capacitance of the capacitor 61 is selected such that the ripple of the bus voltage, which oscillates at a frequency of, for example, 100 Hz, is not filtered out by the capacitor 61 and is provided in the signal vbus to the control device 14, i.e. the cutoff frequency of the corresponding low-pass filter is higher than the frequency of the voltage ripple which is impressed on the supply voltage. The control device 14 can query the value vbus of the bus voltage at a rate which is greater than the frequency of the ripple of the bus voltage. The control device 14 can change the reference in temporally variable fashion, in particular with the period of the ripple of the bus voltage, in order to reduce the ripple of the output current. Adaptation of the reference which is supplied to the comparator and with which the peak current is compared takes place at a rate which is likewise greater than the frequency of the ripple of the bus voltage.

A value iavg, which represents the averaged current through the shunt resistor 23, is supplied to the control device 14 via a further digital-to-analog converter 65. The average value of the current through the shunt resistor 23 can be detected by a capacitor 64 via a resistor 63 and a low-pass filter, for example. The average value of the current through the shunt resistor 23 can be supplied to the control device 14 at a different connection than the signal which is dependent on the peak current through the shunt resistor 23. The averaged current through the shunt resistor 23 is dependent on the output power and therefore on the load which is coupled to the output 35 of the converter. A change in the load, for example a change in the number of supplied LEDs, given a preset bus voltage Vbus results in a change in the averaged current through the shunt resistor 23, which has a known relationship with the load at the output. This makes it possible also to identify the load or changes in the load on the primary side. The reference, which is supplied to the comparator 24 and with which the peak current is compared, can be adapted depending on the load. For this purpose, for example, a linearized model which indicates the load-dependent change in the output current, and/or a table callup can be used to determine the adaptation of the reference that is required in order to reduce the load-dependent change in the output current. The load-dependent change in the output current which would result without compensation, for example depending on the number of supplied LEDs, is known and theoretically understood. The functional dependence of the output current on the load without compensation can be used to define corresponding changes in the reference as a function of the load, which corresponding changes reduce the load-dependent changes in the output current in comparison with the non-compensated response.

The control device 14 can use the value iavg, which is proportional to the averaged current through the shunt resistor 23, for other functions as well. For example, the control device 14 can communicate information on the load, as is detected in the averaged current iavg, to a central control device. As an alternative or in addition, the control device 14 can identify a fault state depending on the averaged current iavg. The fault state can correspond, for example, to a short circuit or to an open circuit at the output of the converter. The control device 14 can initiate a corresponding fault operating state, for example by outputting a fault signal and/or activation of a safety mode and/or shutdown.

In addition to the values which represent the bus voltage and the load, the control device 14 can also receive luminosity commands and can adapt the reference with which the peak current is compared depending on the luminosity commands.

Figure 6:
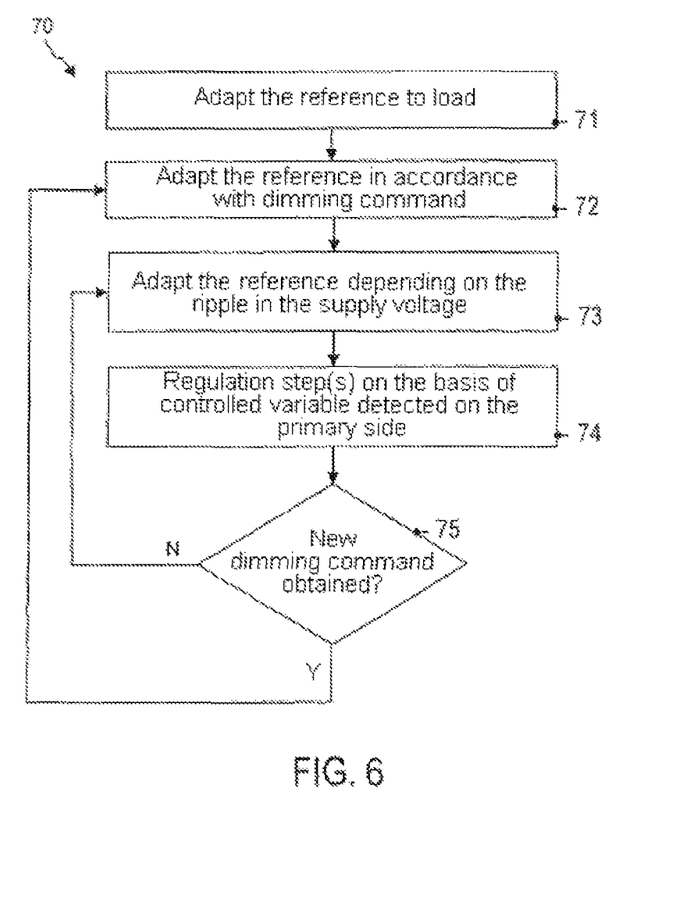
FIG. 6 shows a flowchart of a method in accordance with an exemplary embodiment.

FIG. 6 shows a flow chart of a method 70, which can be implemented by the control device 14. As will be explained with reference to FIG. 6, the adaptation of the reference can take place on different temporal planes or time horizons. A load-dependent change in the reference can be performed only rarely, for example always during starting of the operating device with the converter, for example. Adaptation of the reference depending on a dimming command can always be performed on reception of a dimming command. At a rate which is greater than a frequency of the ripple of the supply voltage for the primary side of the converter, the reference can be adapted to the ripple of the supply voltage.

At 71, the reference is adapted to the load which is connected to the output of the converter. The load can be identified, for example, on starting of the operating device by the converter depending on an averaged current iavg through a shunt resistor. Step 71 can be repeated at relatively long time intervals. As a result, for example, the failure of an LED can be identified and compensated for.

At 72, the reference is adapted depending on a dimming command. Step 72 can be repeated whenever a new dimming command is received.

At 73, the reference is adapted depending on the instantaneous value of the supply voltage on the primary side. As a result, ripple of the output current brought about by ripple in the supply voltage can be corrected in advance by means of forward correction. Step 73 can be performed at a rate which is greater than the frequency of the voltage ripple in the supply voltage, for example greater than 100 Hz.

At 74, a regulation step or a plurality of regulation steps can be performed. In this case, the half-bridge control is adapted in each case depending on a comparison between the primary-side peak current and the reference. For example, the frequency at which the switches in the half-bridge are switched can be changed if the peak current exceeds the reference.

At 75, a check is performed to ascertain whether a new dimming command is received. If a new dimming command is received, the method returns to step 72. Otherwise, the method returns to step 73.

Figure 7:
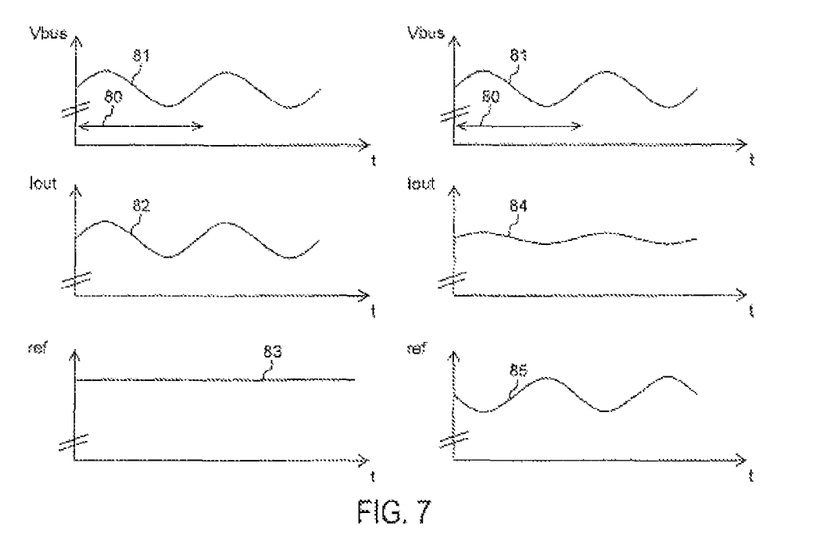
FIG. 7 illustrates the adaptation of a reference depending on a ripple of a bus voltage in order to illustrate in further detail the mode of operation of converters and methods according to exemplary embodiments.

FIG. 7 shows a schematic illustration explaining the correction of the voltage ripple in the supply voltage, with which ripple in the output current can be reduced.

As is illustrated on the left-hand side in FIG. 7, the supply voltage on the primary side has ripple 81. The voltage can fluctuate with a time period 80. The frequency can correspond to 100 Hz, for example. Such ripple can be impressed on the bus voltage provided by the AC-to-DC converter 10 of the operating device 2 in FIG. 1. If the reference ref is kept constant, the ripple in the supply voltage on the primary side of the converter can result in ripple in the output current 82.

If, as illustrated on the right-hand side in FIG. 7, the reference 85 is adapted in time-dependent fashion in accordance with the ripple in the supply voltage, the output current 84 of the converter can have a ripple with a magnitude which is less than in the case of a constant reference. In order to correspondingly adapt the reference in a time-dependent manner, the reference can be changed in each case after a time period which is small in comparison with the period 80 of the ripple of the supply voltage. The supply voltage can be monitored continuously or quasi-continuously, and the reference can be adapted in each case correspondingly.

Figure 8:
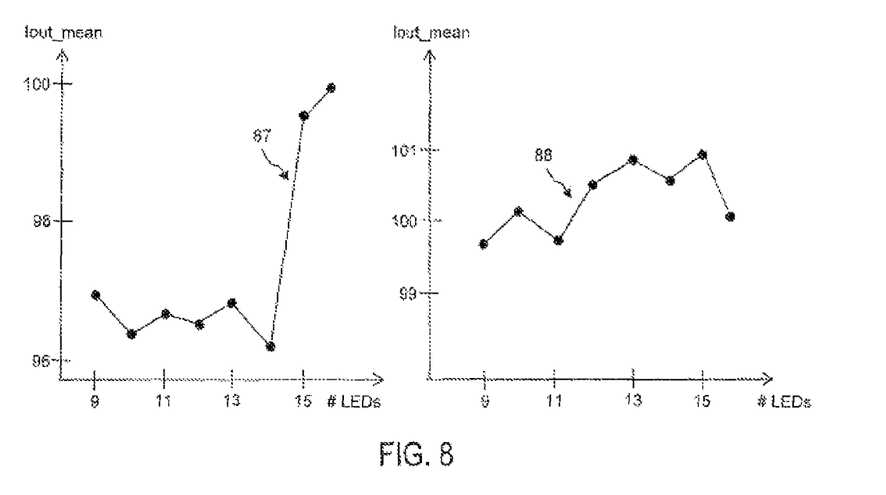
FIG. 8 illustrates the adaptation of a reference depending on a load in order to further illustrate the mode of operation of converters and methods according to exemplary embodiments.

FIG. 8 shows a schematic illustration explaining the compensation of load-dependent changes in the output current. FIG. 8 shows the output current Iout_mean averaged over time as a percentage, normalized to a setpoint value, for different numbers of LEDs, which are an example of different output powers or loads to which power is supplied by the converter.

The left-hand side in FIG. 8 shows the case where no load-dependent compensation is performed. If, on the basis of a lighting system with sixteen LEDs, the number of LEDs is reduced, this results in a change in the averaged output current of the converter supplied to the LEDs. The corresponding change has a functional dependence 87. In the illustrated case, a fluctuation in the averaged output current of up to 4% can be observed.

The right-hand side in FIG. 8 shows the case where the control device identifies the load on the primary side, for example from the averaged current through the shunt resistor, and performs load-dependent compensation. Compensation on the basis of a linearized model was performed for the data illustrated on the right-hand side in FIG. 8. The reference can be increased or decreased, depending on the averaged current through the shunt resistor, by a value which is dependent on the averaged current through the shunt resistor. In addition to a linearized model in which the change in the reference is linearly dependent on the averaged current through the shunt resistor, a family of characteristics or a plurality of families of characteristics can also be used for further reducing load-dependent influences of the output current. As illustrated on the right-hand side in FIG. 8, compensation on the basis of a linearized model already results in a reduction in the load-dependent effects in the output current.

Further modifications of the converter and the methods can be implemented in further exemplary embodiments. By way of example, two further converters in accordance with exemplary embodiments are described with reference to FIG. 9 and FIG. 10, wherein elements which correspond in terms of configuration and function to elements which have been described with reference to FIGS. 1-8 are denoted by the same reference symbols.

Figure 9:
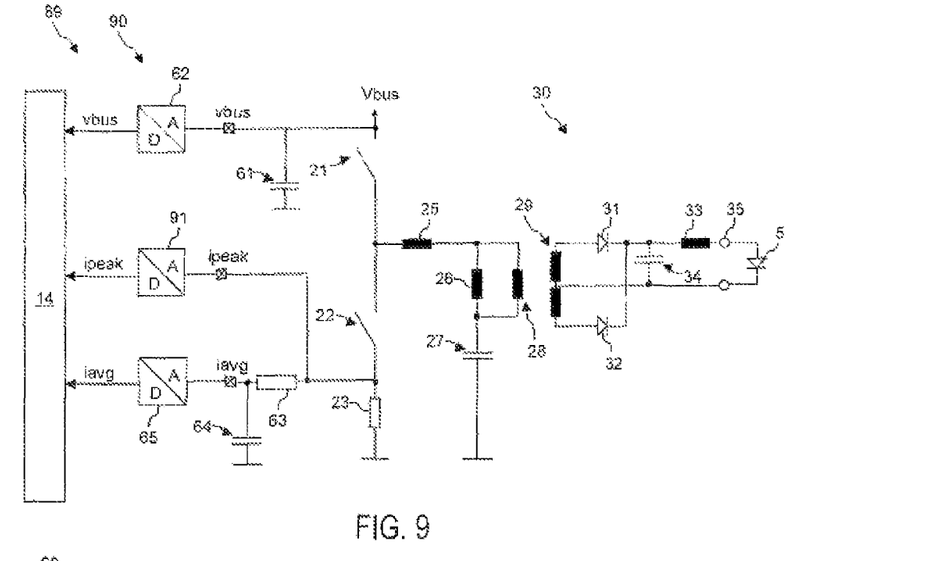
FIG. 9 shows a circuit diagram of a converter in accordance with a further exemplary embodiment.

FIG. 9 shows a converter 89 in accordance with a further exemplary embodiment, which converter has a primary-side circuit 90 and a secondary-side circuit 30. In the case of the converter 89, the signal indicating the peak current through the shunt resistor 23 is not compared with an analog reference signal. Information on the current intensity through the shunt resistor 23 is supplied to the control device 14 via the analog-to-digital converter 91. The control device 14 can check computationally whether the peak current through the shunt resistor 23 exceeds a reference. In this case, the reference is a digital reference value which is managed by the control device 14. In contrast to the converters shown in FIG. 2 and FIG. 5, an analog reference signal does not need to be generated.

The adaptation of and/or change to the reference can be performed by the control device 14, as described with reference to FIGS. 1-8.

Figure 10:
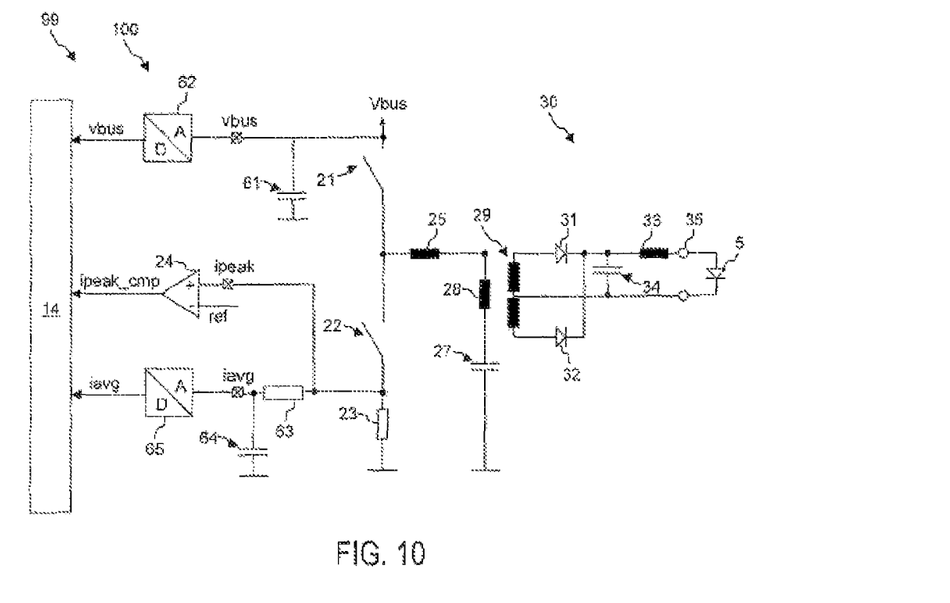
FIG. 10 shows a circuit diagram of a converter in accordance with a further exemplary embodiment.

FIG. 10 shows a converter 99 in accordance with a further exemplary embodiment, which has a primary-side circuit 100 and a secondary-side circuit 30. In the case of the converter 99, the primary-side circuit 100 has the half-bridge circuit with switches 21, 22 with clocked operation. In the case of the LLC resonant circuit of the converter 99, the primary coil 28 of the transformer at the same time acts as the greater of the inductances in the LLC resonant circuit.

While exemplary embodiments have been described with reference to the figures, modifications can be realized in further exemplary embodiments. For example, regulation of the output current of the converter, which is configured as an FCC device, can also be performed depending on another controlled variable detected on the primary side. While the use of the peak current through the shunt resistor as controlled variable can be realized with little complexity in terms of circuitry, a separate, further resistor can also be used, for example, which can be integrated in the half-bridge circuit, for example. The peak current through this further resistor can be used as controlled variable in order to regulate the output current of the converter to a setpoint value.

While exemplary embodiments have been described in which load identification has been performed depending on an average value of the current through the shunt resistor, the load identification can also be performed depending on other variables, in particular variables detected on the primary side.

While exemplary embodiments have been described in which the control device can adapt the reference on the basis of different variables, for example the ripple in the bus voltage and the identified load, and different time horizons, for example, only adaptation of the reference depending on the ripple of the supply voltage or only adaptation of the reference depending on the identified load can also take place.

Inductances and capacitances can each be formed by corresponding inductive and capacitive elements. However, it is also possible for relatively small inductances, for example the relatively small inductance in the LLC resonant circuit, to be formed as a leakage inductance.

Converters and methods in accordance with exemplary embodiments can be used in particular for supplying energy to LEDs.

What is claimed is:

1. A converter with electrical isolation, which is configured to supply power to a light-emitting means (3; 5), the converter comprising:
   a primary-side circuit (20; 60; 90; 100) having a half-bridge circuit, which has two alternately clocked switches (21, 22), and having a resonant circuit (25-27; 25, 26, 28), which is coupled to a node between the two switches (21, 22), wherein the resonant circuit (25-27; 25, 26, 28) comprises:
      an LLC resonant circuit (25-27; 25, 26, 28),
      a secondary-side circuit (30) with an output (35) for supplying energy to the light-emitting means (3; 5), and
      a control device (14), which is configured to control the half-bridge circuit depending on a controlled variable (ipeak) detected in the primary-side circuit (20; 60; 90; 100) in order to regulate a current intensity provided at the light-emitting means (3; 5) by the secondary-side circuit (30) to a setpoint value,
   wherein the control device (14) is configured to control the half-bridge circuit depending on a comparison between the controlled variable (ipeak) and a reference (ref),
   wherein the primary-side circuit (20; 60; 90; 100) is configured to provide information (vbus) on a supply voltage (Vbus; 83) of the primary-side circuit (20; 60; 90; 100) to the control device (14), and
   wherein the control device (14) is configured to change the reference (ref; 85) depending on the information (vbus; 83) on the supply voltage, and wherein adaption of the reference (ref; 85) which is supplied to a comparator (24), which is coupled to the control device (14), and with which the controlled variable (ipeak) is compared, takes place at a rate which is greater than a frequency of a ripple of the supply voltage (Vbus; 83).

2. The converter as claimed in claim 1, wherein the control device (14) is configured to set a frequency at which the two switches (21, 22) in the half-bridge circuit are switched, depending on the detected controlled variable (ipeak), in order to regulate the current intensity provided at the light-emitting means (3; 5) by the secondary-side circuit (30) to the setpoint value.

3. The converter as claimed in claim 1, wherein the control device (14) is configured to change the reference (ref; 85) depending on the ripple of the supply voltage (Vbus; 83) in time-dependent, periodic, fashion.

4. The converter as claimed in claim 1, wherein the control device (14) is configured to change the reference (ref) depending on a dimming command.

5. The converter as claimed in claim 1, wherein the control device (14) is configured to determine information on a load (3; 5), which is connected to the output (35) of the secondary-side circuit (30), depending on a measured variable (iavg) detected in the primary-side circuit (20; 60; 90; 100).

6. The converter as claimed in claim 5, wherein the control device (14) is configured to detect a change in a number of LEDs which are connected to the output of the secondary-side circuit (30) depending on the measured variable (iavg).

7. The converter as claimed in claim 5, wherein the control device (14) is configured to implement at least one of the following actions depending on the measured variable (iavg):
   adaptation of the reference (ref) depending on the measured variable (iavg) in order to compensate for load-dependent changes in luminosity;
   power limitation;
   fault detection for initiating a fault mode;
   generation of a signal depending on the measured variable (iavg) and output of the signal to a signal bus (4).

8. The converter as claimed in claim 5, wherein the controlled variable (ipeak) is proportional to a peak value of a current in the primary-side circuit (20; 60; 90; 100), and the measured variable is proportional to an average value of the same current in the primary-side circuit (20; 60; 90; 100).

9. The converter as claimed in claim 5, wherein the primary-side circuit (20; 60; 90; 100) comprises a shunt resistor (23), which is connected in series with the switches (21, 22) in the half-bridge circuit, wherein the controlled variable (ipeak) is proportional to a peak current through the shunt resistor (23), and the measured variable (iavg) is proportional to an average value of the current through the shunt resistor (23).

10. The converter as claimed in claim 1, wherein the resonant circuit (25-27; 25, 26, 28) comprises an inductive element (25) and a capacitive element (27), which are connected in series with a primary coil (28) of a transformer.

11. The converter as claimed in claim 1, wherein the secondary-side circuit (30) comprises a further inductive element (33), which is connected to the output (35).

12. The converter as claimed in claim 1, wherein the converter is configured as a constant current source.

13. An LED converter device, comprising the converter (19; 59; 89; 99) as claimed in claim 1.

14. A method for operating a converter (19; 59; 89; 99) for a light-emitting device (3; 5), wherein the converter (19; 59; 89; 99) has a primary-side circuit (20; 60; 90; 100) and a secondary-side circuit (30) galvanically isolated therefrom, wherein the primary-side circuit (20; 60; 90; 100) comprises a half-bridge circuit, which has two alternately clocked switches (21, 22), and a resonant circuit (25-27; 25, 26, 28), which is coupled to a node between the two switches (21, 22), wherein the resonant circuit (25-27; 25, 26, 28) comprises an LLC resonant circuit (25-27; 25, 26, 28), wherein the method comprises:

controlling the half-bridge circuit depending on a controlled variable (ipeak) detected in the primary-side circuit (20; 60; 90; 100) in such a way that a current intensity output by the secondary-side circuit (30) to the light-emitting device (3; 5) is regulated to a setpoint value, wherein the half-bridge is controlled by a control device (14) which is configured to control the half-bridge circuit depending on a comparison between the controlled variable (ipeak) and a reference (ref), wherein the primary-side circuit (20; 60; 90; 100) is configured to provide information (vbus) on a supply voltage (Vbus; 83) of the primary-side circuit (20; 60; 90; 100) to the control device (14), and wherein the control device (14) is configured to change the reference (ref; 85) depending on the information (vbus; 83) on the supply voltage and wherein adaption of the reference (ref; 85) which is supplied to a comparator (24), which is coupled to the control device (14), and with which the controlled variable (ipeak) is compared, takes place at a rate which is greater than a frequency of a ripple of the supply voltage (Vbus; 83).

* * * * *